United States Patent [19]

Peterson, Jr. et al.

[11] 3,994,390
[45] Nov. 30, 1976

[54] INTERMEDIATE DRIVE FOR BELT CONVEYOR WITH CENTER VERTEBRAE

[75] Inventors: William J. Peterson, Jr., Coraopolis; William K. Kleysteuber, Wexford, both of Pa.

[73] Assignee: The United States of America as represented by the Secretary of the Interior, Washington, D.C.

[22] Filed: Nov. 18, 1975

[21] Appl. No.: 633,139

[52] U.S. Cl. .............................................. 198/833
[51] Int. Cl.² ....................................... B65G 23/00
[58] Field of Search ................... 198/203, 179, 180; 226/173

[56] References Cited
UNITED STATES PATENTS

| 2,732,059 | 1/1956 | Erisman | 198/203 |
| 2,759,595 | 8/1956 | Lavenstein | 198/203 |
| 3,289,304 | 12/1966 | White | 226/173 |
| 3,684,145 | 8/1972 | Jenkins | 226/173 |

FOREIGN PATENTS OR APPLICATIONS 1,120,362   12/1961   Germany ........................... 198/203

*Primary Examiner*—Evon C. Blunk
*Assistant Examiner*—Joseph E. Valenza
*Attorney, Agent, or Firm*—Thomas Zack; Gersten Sadowsky

[57] ABSTRACT

This invention relates to a belt conveyor apparatus comprised of a main conveying belt on which cargoes are carried and a plurality of sub-belt devices arranged successively along the length of the main conveying belt, the upper cargo-carrying portion of the main conveying belt surmonting the sub-belt devices. Longitudinally disposed vertebrae extend from the underside of said main conveying belt and into engagement with clamping structure on the sub-belt devices, said clamping structure releasably holding the vertebrae to drive the main belt on powered movement of said sub-belt devices.

10 Claims, 5 Drawing Figures

INTERMEDIATE DRIVE FOR BELT CONVEYOR WITH CENTER VERTEBRAE

BACKGROUND OF THE INVENTION

1. Field of the Invention

The invention relates to the art of belt conveyors useful particularly for moving articles over relatively long distances. Specifically, the invention relates to intermediate drive means for belt conveyors wherein at least one article transporting belt is carried and driven by at least one endless intermediate drive member.

2. Description of the Prior Art

Prior conveying devices are known wherein a conveying belt is driven by an intermediate drive member, such as an endless chain, by means of intermediate carrying plates. The conveying belt itself is thereby relieved from carrying both the stress of the powered driving mechanism and the weight of the material being conveyed. A number of varied arrangements have been used to transmit motive power from an intermediate drive member to the conveying belt, the most widely known being that arrangement wherein the weight of the material on the conveying belt causes said belt to be downwardly biased into frictional engagement with said intermediate drive member.

The devices of the prior art, as particularly evidenced by the example described, do not provide as positive an engagement between the conveying belt and the intermediate drive member or members as could be desired. For example an non-uniformly loaded conveying belt according to certain examples of the prior art would not always be loaded sufficiently to contact all portions of the belt with the underlying drive members. The prior art also does not provide reliable apparatus for positively connecting and disconnecting the conveying belt to and from an intermediate drive member. It is particularly desirable to provide such a connection and disconnection mechanism wherein the weight of the material on the conveying belt does not affect such connection and disconnection.

SUMMARY OF THE INVENTION

It is therefore desirable to provide a conveyor apparatus which can be comprised of at least one conveying belt, which belt may be formed in a closed loop, and which is driven by one or more intermediate drive members releasably coupled to the conveying belt and which provides apparatus for positively connecting said intermediate drive members to the conveying belt. The present invention provides such an apparatus by providing releasable clamping members carried on the intermediate drive members, the clamping members engaging longitudinally disposed central vertebrae on the conveying belt. The vertebrae extend from that surface of the conveying belt which is opposite to the surface thereof on which material to be conveyed is disposed. The clamping members on the intermediate drive members are passively biased into engagement with the vertebrae by the camming action of stationery indexing dogs disposed along the path of movement of the conveying belt.

It is therefore a primary object of the invention to provide a conveying apparatus wherein a conveying belt is supported and driven by intermediate drive members arranged successively along the conveying belt, the drive members being releasably clamped to the conveying belt to provide positive engagement between the belt and the drive members.

It is a further object of the invention to provide a conveying belt apparatus for conveying articles wherein the belt bearing the weight of said articles does not also bear the driving stress, thereby allowing said belt to be smaller in cross-section and lower in weight and cost.

Further objects and advantages of the invention will become more apparent in light of the following detailed description of the preferred embodiment of the invention.

DESCRIPTION OF THE PREFERRED EMBODIMENT

Figure 1:
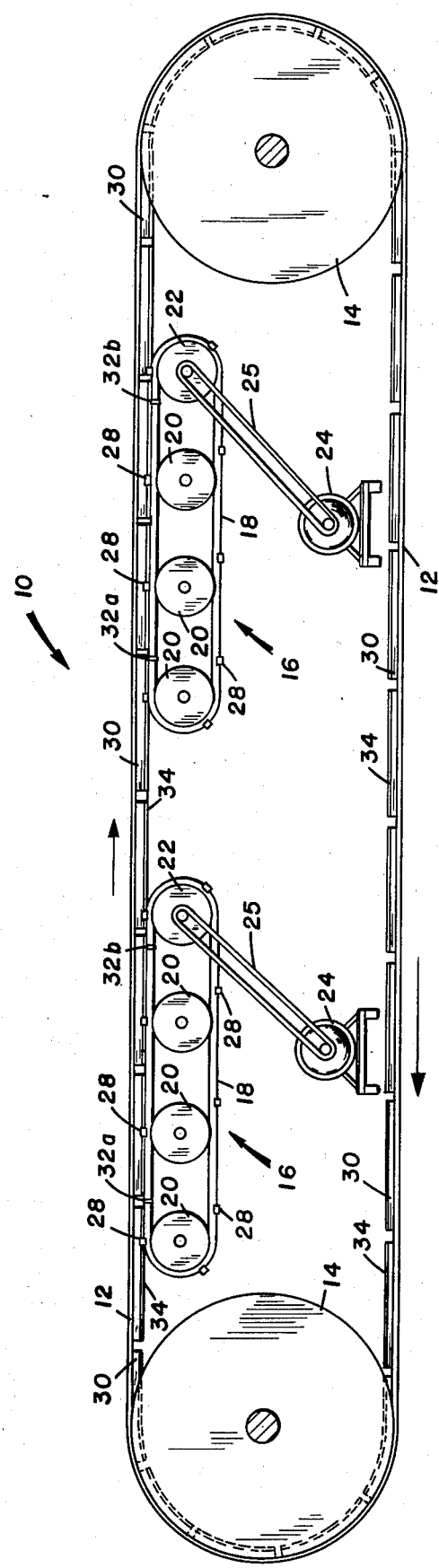
FIG. 1 is a diagram illustrating the basic principles of operation of a conveyor apparatus according to the invention.
Figure 2:
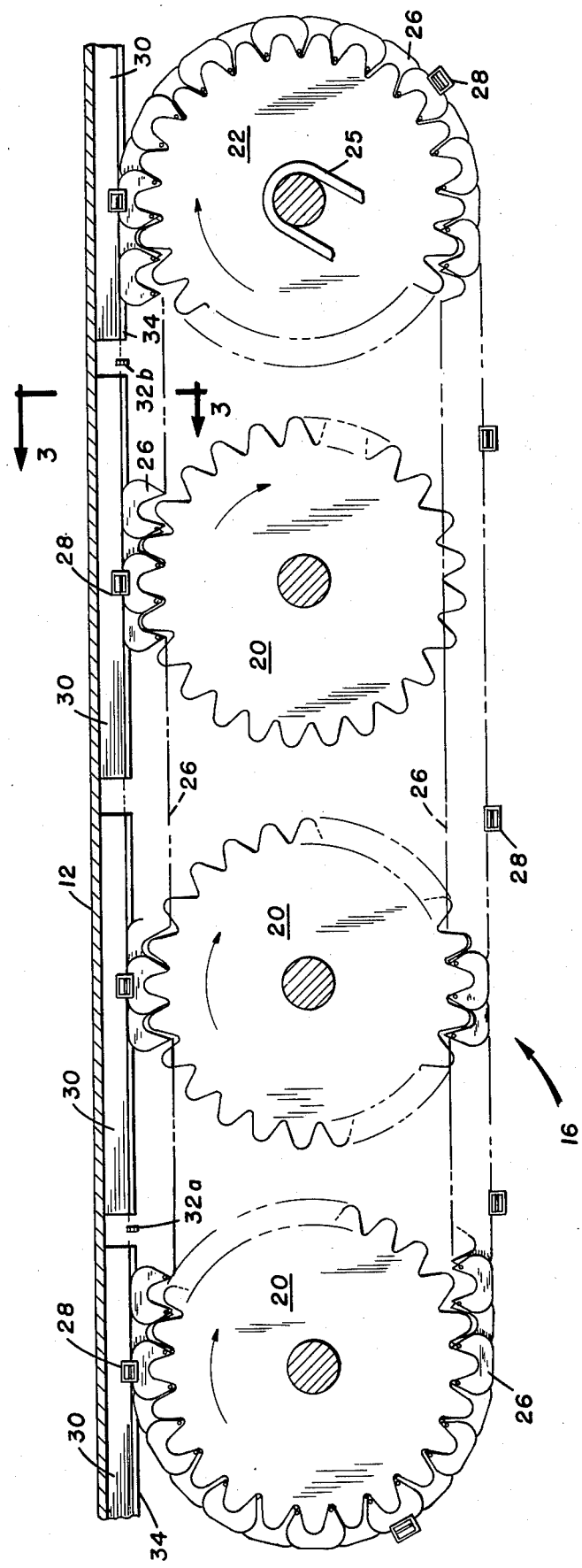
FIG. 2 is a detail elevation view in partial section of the intermediate drive member of the invention.

The invention may best be understood by referring first to FIG. 1 wherein a conveying system is shown at 10 to comprise a conveyor belt 12 formed into an endless loop about two spaced idler wheels 14. The belt 12 is driven around the wheels 14 by means of at least one intermediate drive member 16, two of said members 16 being shown for illustration in FIG. 1. The belt 16 may be formed in any convenient length, the number of drive members 16 needed to drive the belt being related to the length of the belt. Each of the drive members 16, as can be seen in both FIG. 1 and FIG. 2, comprise a silent chain 18 formed into loops about toothed sprocket wheels 20 and 22, the wheels 20 being idler wheels and the wheel 22 being driven via belt 25 by a motor 24. All of the wheels, i.e., the wheels 14, 20, and 22 are mounted for rotation within a housing structure (not shown except for a portion thereof in FIG. 3) in a well-known fashion.

The chain 18 is formed of links 26, certain of the links 26 carrying clamping members 28 spaced regularly along the chain 18. FIG. 5 particularly illustrates one of the clamping members 28 being carried on one of the links 26. As can be seen generally in FIGS. 1 and 2, and in greater detail of FIGS. 3 through 5, the clamping members 28, when on the upper portion of the path of travel of the chain 18, clamp onto one of the resilient vertebrae 30 which are longitudinally disposed on and attached to the underside of the belt 12. The vertebrae 30 are spaced along the longitudinal center line of the belt 12 and are not continuous therealong so that the belt 12 can curve about the idler wheels 14. Each vertebra 30 can be made of such a length that more than one of the clamping members 28 can simultaneously engage one vertebra.

Figure 3:
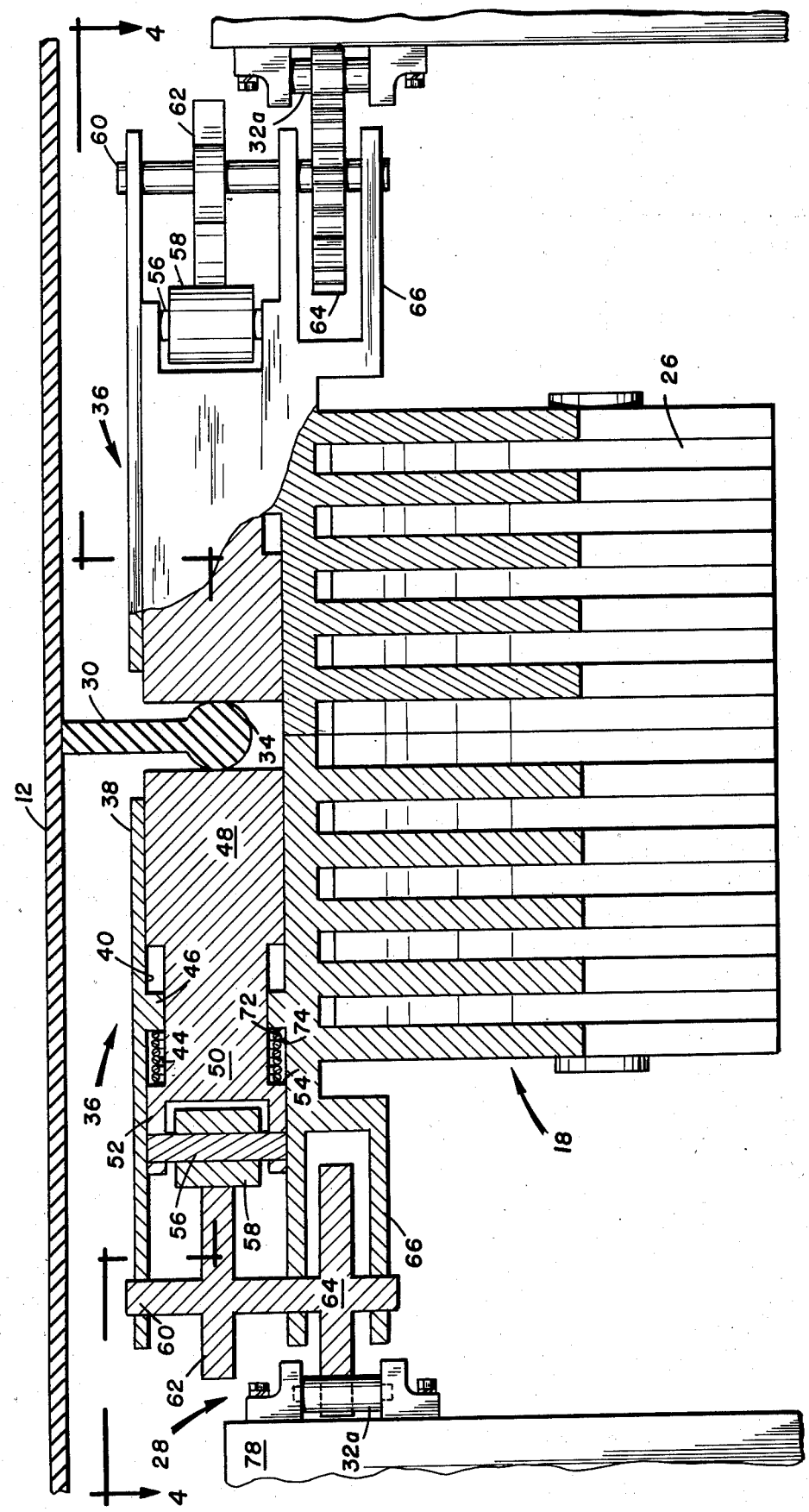
FIG. 3 is a detail section on the line 3—3 of FIG. 2.

The clamping members 28 are passively caused to engage and disengage with the vertebrae 30 through the camming action of stationary dogs 32a and 32b which are disposed on the housing structure of the system 10 as will be described in detail hereinafter. The vertebrae 30 have enlarged contact end portions 34 which can be essentially circular in cross-section as seen in FIG. 3 and which are the portions of the vertebrae 30 onto which the members 28 clamp. In operation, the clamping members 28 are biased into clamping engagement with the vertebrae 30 by the camming action of the dogs 32a as said members 28 are brought around the end wheel 20 and onto the upper portion of the path of travel of the chain 18. Thus, the motor-driven chain 18 is secured to the belt 12 through the clamping action of the clamping members 28 on the vertebrae 30. The chains 18 of the several intermediate drive members 16 thereby drive the belt 12 about its endless travel path. It is to be understood that as few as one of the intermediate drive members 16 could be employed to drive and support a conveyor belt such as the belt 12. However, for conveyor belt of a practical length, a plurality of the drive members 16 are to be regularly spaced beneath the belt 12 and along the upper portion of the travel path of the belt 12. Each of the drive members 16 will have at least one of the clamping members 28 in engagement with the belt 12 at all times to drive said belt throughout its path of travel including the return portion thereof. It is to be further understood that the idler wheels 14 are not usually powered but serve simply to hold the belt 12 in a loop-like conformation and to continuously guide the belt 12 about its path of travel.

Figure 4:
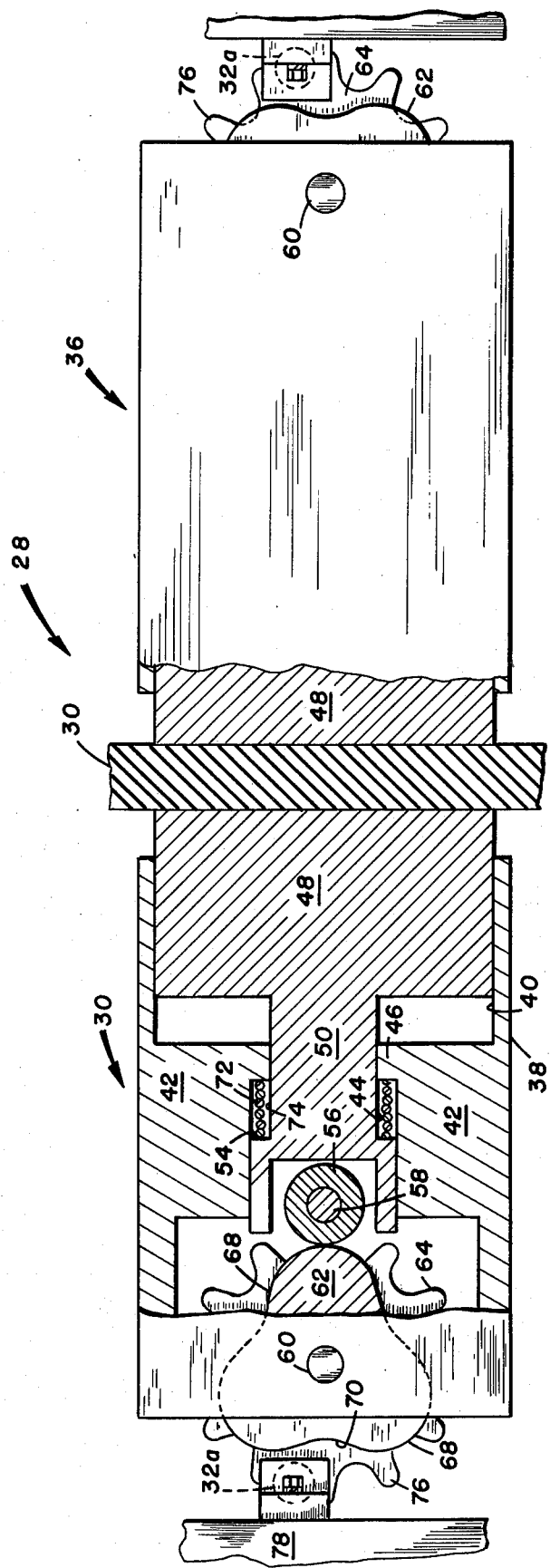
FIG. 4 is a detail section on the line 4—4 of FIG. 3.
Figure 5:
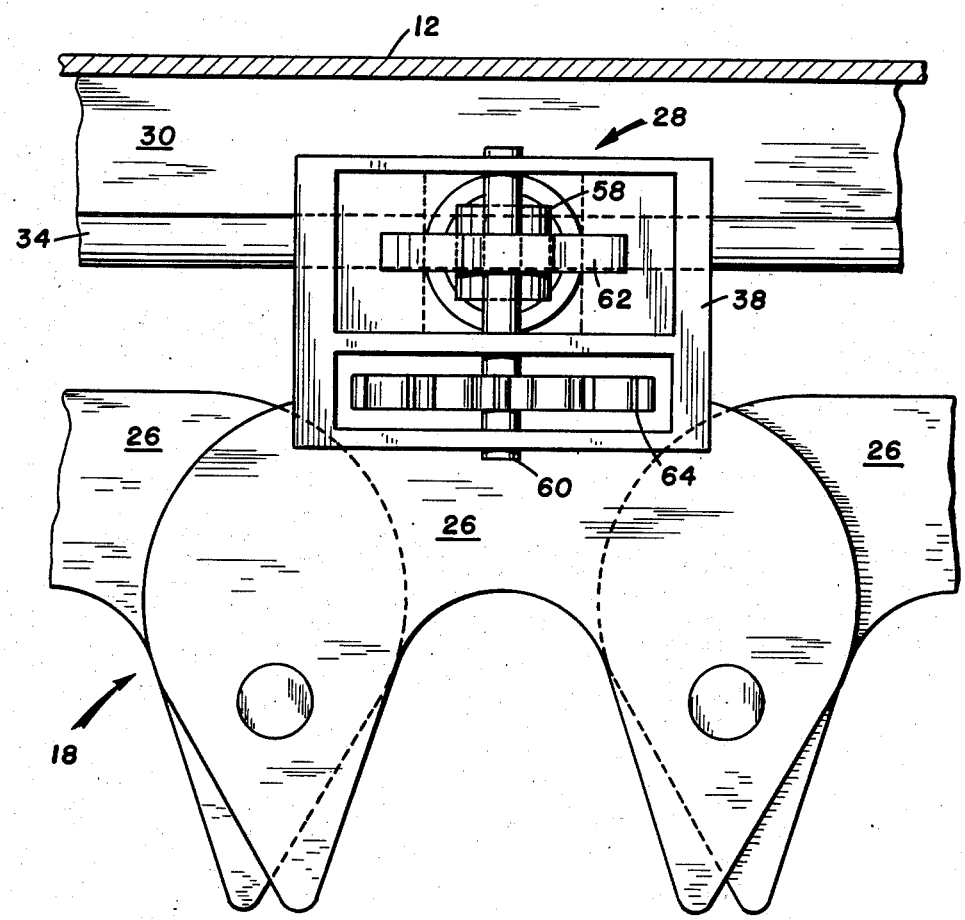
FIG. 5 is a detailed end view of a portion of the chain carrying one of the clamping mechanisms.

Referring now to FIGS. 3 and 4 in particular, the structure of one of the clamping members 28 can be seen in detail to comprise two separate sections 36, since the sections 36 are identical in structure and operation, only one of the sections 36 will be described. The sections 36 are both carried on one of the chain links 26, each section 36 comprising a housing 38 of an essentially rectangular solid conformation and having a chamber 40 formed in the inner end thereof. The chamber 40 is defined by an internal abutment 42 at its outer end portion, which abutment 42 has a channel 44 extending therethrough to communicate the chamber 40 with the outer end portion of the section 36. A shoulder 46 extending from he abutment 42 extends into the channel 44 at the juncture of the channel 44 with the chamber 40. A clamping plunger 48 is received within the chamber 40 and is movable therein, the plunger 48 having a relatively narrow neck 50 extending from its outer end and being received within the channel 44. The neck 50 terminates in a box-like flange 52, which flange has a shoulder 54 thereon. The plunger 48 moves within the chamber 48 in a manner to be described to engage one side of the enlarged contact portion 34 of one of the vertebrae 30. Since the plungers 48 from each of the sections 36 are aligned and come together on opposite sides of the vertebra 30, the vertebra 30 is clamped between the opposing blunt faces of the plungers 48. The belt 12 is thus connected through the thus clamped vertebrae 30 to the chain 18 and is thereby driven along its path of travel.

The box-like flange 52 on the outer end of the plunger neck 50 has a pin 56 mounted for rotation within the volumetric confines of the flange 52. The pin 56 has a cylindrical cam follower 58 mounted thereon. The housing 38 at its outer end has a shaft pin 60 mounted for rotation therein, the shaft pin 60 having a clamping cam 62 mounted thereon near its upper end and an indexing cam 64 mounted thereon near its lower end. The pin 60 can be mounted also by a lateral extension 66 of the housing 38, which extension 66 and housing 38 define an open-ended enclosure which houses the indexing cam 64. The clamping cam 62 can be formed in a variety of geometrical shapes according to well-known prior practices. The cam 62 is seen in FIG. 4 to have three lobes 68 which curve inwardly to form recessed portions 70. The cam 62 is mounted in spaced relation to the cam follower 58 such that the cam follower 58 follows the curvature of the cam 62 under the bias of a sprig 72 which fits into a recess 74 formed within the channel 44 and defined further by the shoulders 46 and 54. The spring 72 acts against the outer surface of the shoulder 46 and the inner surface of the shoulder 54 to bias the clamping plunger 48 outwardly away from the vertebrae 30. The lobes 68 of the clamping cam 62, however, act to bias the cam follower 58, and thus the plunger 48 which is structurally connected to the cam follower 58, toward the vertebrae 30 for clamping of one of the vertebrae 30 between the plungers 48 as previously described. When one of the recessed portions 70 of the cam 62 is rotated in opposed contacting relations to the cam follower 58, the plunger 48 is biased by the spring 72 away from engagement with the enlarged contact end portion 34 of the vertebra 30. The belt 12 is thereby disconnected from the clamping member 28.

The shaft pin 60 is rotated in order to selectively provide the aforementioned engagement and disengagement of the plunger 48 by means of the indexing cam 64 which is mounted on the lower portion of the shaft pin 60. The indexing cam 64 has teeth 76 regularly disposed about its periphery, the teeth 76 contacting the dogs 32a and 32b on movement of the chain 18 within its predetermined loop-like path. The dogs 32a and 32b were previously described as being mounted in a stationary manner on the structural housing of the conveyor system 10, a portion 78 of the housing being seen in FIGS. 3 and 4 to mount the dogs 32a and 32b.

In operation, the clamping member 28 advances around the endmost idler sprocket wheel 20 and onto the upper portion of the travel path of the chain 18. On movement over this upper portion of the travel path, at least one of the teeth 76 on each of the indexing cams 64 within each section 36 is caused to contact the stationary dogs 32a, thereby rotating each indexing cam 64 on continuing movement of the chain 18 past the dog 32a. The shaft pin 60 mounting the indexing cam 64 is thus rotated and simultaneously rotates the clamping cam 62 mounted on said shaft pin 60. One of the lobes 68 on the clamping cam 62 is thereby moved into the position most clearly shown in FIG. 4, whereby the plunger 48 is biased inwardly against the force exerted by the spring 72 to engage the portion 34 on one of the vertebrae 30. The opposing plungers 48 on each of the clamping members 28 clamp the vertebra 30 therebetween during travel of the members 28 along the upper portion of the path of travel of the chain 18. At a point near the driven sprocket wheel 22, the indexing cams 64 on each member 28 are caused to rotate on contact with the stationary dogs 32b, the clamping cam 62 thereby rotating to a position wherein one of the recessed portions 70 contacts the cam follower 58. Thus, the spring 72 causes the plungers 48 to move outwardly from engagement with the vertebra 30 on rotation of the shaft pin 60.

It is therefore seen that the clamping members 28 act to releasably clamp the enlarged end portion 34 of each vertebra 30, so that the chain 18 to which the members 28 are attached is enabled to drive the belt 12 about its loop-like path of travel. It is to be understood that the invention is not to be limited by the description of the preferred embodiment thereof as described above, the scope of the invention being defined by the appended claims.

What is claimed is:

1. A belt conveyor apparatus comprising:

an endless major belt;

contact means disposed on and attached to the major belt;

intermediate drive means for releasably engaging the contact means to move the major belt along a predetermined path of travel;

said intermediate drive means comprising clamping means extending transversely of the predetermined path of travel of the major belt and adopted to clamp the contact means; said clamping means comprising opposing clamping plungers within said clamping means for engaging the contact means between inner end portions of the clamping plungers;

a cam follower mounted for rotation on the outer end portion of each of the clamping plungers;

cam means mounted for rotation on the outer end of each of the clamping means, the cam follower following the cam means to move the clamping plungers relative to the contact means; path of travel, at least a part of which is co-extensive with the path of travel of the major belt; and means for mounting the endless major belt and the chain means along their respective predetermined paths of travel.

2. The belt conveyor of claim 1 wherein the means mounting the major belt has stationary dog means disposed thereon and wherein the cam means comprise:

a clamping cam, the cam follower following the contours of the periphery thereof; and, an indexing cam having teeth means which contact the stationary dog means on movement of the clamping means relative to the dog means to rotate the cam means.

3. The belt conveyor of claim 2 and further comprising spring means mounted within the clamping means for biasing the clamping plungers outwardly from the point of engagement of the plungers with the contact means.

4. The belt conveyor of claim 3 wherein each clamping cam comprises a plurality of lobes around the periphery of said cam, the lobes alternating with recessed portions of the periphery of the cam, the cam follower following the contours of the periphery of each clamping cam to cause each plunger to be biased inwardly into engagement with the contact means on contact between one of the lobes and the cam follower, the plunger being biased outwardly away from engagement with the contact means on contact between one of the recessed portions of the clamping cam and the cam follower due to the force provided by the spring means.

5. The belt conveyor of claim 1 wherein the contact means comprise a plurality of vertebrae spaced regularly along the longitudinal center line of the major belt along the direction of travel thereof and being disposed on the underside of the belt and is opposed relation to clamping means.

6. The belt conveyor of claim 4 wherein the contact means comprises a plurality of vertebrae spaced regularly along the longitudinal center line of the major belt and being disposed on the underside of the belt in opposed relation to the inner end portions of the clamping plungers.

7. The belt conveyor of claim 6 wherein the vertebrae each have an enlarged contact end portion along the outer edge thereof, which portion is clamped between the inner end portions of the clamping plungers.

8. The belt conveyor of claim 6 wherein the vertebrae are formed of a resilient material.

9. A belt conveyor apparatus comprising:

an endless major belt;

contact means disposed on and attached to the major belt;

intermediate drive means for releaseably engaging the contact means to move the major belt along a predetermined path of travel;

means for mounting the endless belt along the predetermined path of travel;

said drive means having clamping means extending transversely of the predetermined path of travel of the major belt and adopted to clamp the contact means;

chain means carrying the clamping means about a second predetermined path of travel, at least a part of which is co-extensive with the path of travel of the major belt;

said chain means having mounting means along its predetermined path of travel;

a plurality of spaced stationary dog means disposed on said means for mounting the endless belt; and said clamping means having means to momentarily engage said stationary dog means for successively causing the contact means to be firmly clamped and then stay in firm non-moving contact until the next stationary dog means is sequentially engaged.

10. The apparatus of claim 9 wherein said means to momentarily engage said dog means comprises:

an indexing cam having teeth means which contact the stationary dog means;

a clamping cam movable with said indexing cam; and a cam follower to follow the contours of the periphery of said clamping cam.

* * * * *